No. 734,392. Patented July 21, 1903.

UNITED STATES PATENT OFFICE.

WILLIAM J. ARMBRUSTER, OF ST. LOUIS, MISSOURI.

PIGMENT AND PROCESS OF MAKING SAME.

SPECIFICATION forming part of Letters Patent No. 734,392, dated July 21, 1903.

Application filed August 25, 1902. Serial No. 121,000. (No specimens.)

*To all whom it may concern:*

Be it known that I, WILLIAM J. ARMBRUSTER, a citizen of the United States, residing at St. Louis, State of Missouri, have invented certain new and useful Improvements in Pigments and Processes of Making the Same, of which the following is a specification.

My invention has relation to improvements in compositions of matter to be used for pigments and in the process of making the same; and it consists, respectively, in the novel product and in the new steps more fully set forth in the specification and pointed out in the claims.

The composition consists of an intimate mixture of the precipitates of basic zinc carbonate and barium carbonate, with or without an admixture of zinc sulfid, and in proportions determined by the molecular weights of the soluble salts from which the precipitates are derived. In the preparation of my composition I employ mixtures of zinc salts, barium salts, and the carbonates of the alkali metals, bringing them together in an order to effect the necessary precipitation, it being understood that the salts of zinc and barium are preferably such as will not react on each other.

As an illustration of the general principle here enunciated I prepare solutions of zinc chlorid and barium chlorid, or zinc nitrate and barium nitrate, or zinc acetate and barium acetate, and to either of these I add the carbonate of a suitable alkali metal, thereby effecting a precipitation of the respective basic carbonate of zinc and carbonate of barium, as will be apparent from either of the following reactions:

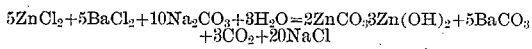

or

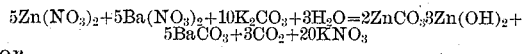

or

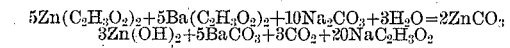

The final solution is drained away, the precipitates washed and thoroughly mixed, freed from the superfluous water by filter-pressing or otherwise, and dried, if desired. The basic zinc-carbonate constituent can be converted to zinc oxid by calcination or otherwise, if desired. As seen from the foregoing reactions, the precipitates are formed practically simultaneously.

Where practical considerations demand the employment of zinc and barium salts which would react on each other if brought together before the addition of the alkali-metal carbonate, the order of mixing as contained in the foregoing reactions may be altered to suit the new conditions. For example, in employing the sulfate of zinc and the sulfid of barium (a salt cheaper than either the chlorid, nitrate, or acetate of the same base) I first add to five equivalents of zinc sulfate five equivalents of the carbonate of an alkali metal, producing thereby a basic carbonate of zinc and five equivalents of the sulfate of the alkali metal. I then take five equivalents of barium sulfid and add thereto five equivalents of the carbonate of the alkali metal, producing a precipitate of five equivalents of barium carbonate and a solution of five equivalents of the sulfid of the alkali metal used. This mode is apparent from the following reactions:

Of course it is apparent that were the zinc sulfate and barium sulfid brought together at the outset there would result the precipitates of zinc sulfid and barium sulfate, both of which are to be avoided.

Where, as in the last reaction, the sulfid of barium is used, resulting in the production of a final solution of sodium sulfid, the latter solution may be taken advantage of in extending the process to the further precipitation of zinc sulfid as a third ingredient of my composition, as follows: To the sodium-sulfid solution referred to a solution of zinc salt can be added, when zinc sulfid will be precipitated, leaving a solution of sodium salt the acid of which will correspond with the acid of the zinc salt used. For example, if we add zinc sulfate to the sodium sulfid we obtain a precipitate of zinc sulfid and a solution of sodium sulfate, thus:

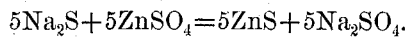

In that case the final product would result in a mixture of basic zinc carbonate, barium carbonate, and zinc sulfid.

While no mention is made of any specific disposition of the final solutions remaining after the formation of the precipitates, it may be stated that these are disposed of in any manner most convenient and profitable to the manufacturer.

The determination of the actual quantities of the materials used in the foregoing reactions is a simple stoichiometric problem based upon the atomic weights of the elements constituting any molecule, and as a commercial illustration of the formula contained in the modification employing the sulfid of barium and sulfate of zinc the following may be cited: I prepare aqueous solutions of the following ingredients in the proportions named—viz., anhydrous zinc sulfate, eight hundred and five (805) pounds; anhydrous sodium carbonate, ten hundred and sixty (1060) pounds; barium sulfid, eight hundred and forty-five (845) pounds. The zinc-sulfate solution and one-half of the sodium-carbonate solution are brought together, when five hundred and forty-seven (547) pounds of basic zinc carbonate are precipitated and seven hundred and ten (710) pounds of sodium sulfate remain in solution. The barium-sulfid solution and the remaining half of the sodium-carbonate solution are brought together, when nine hundred and eighty-five (985) pounds of barium carbonate are precipitated, leaving three hundred and ninety (390) pounds of sodium sulfid in solution. The solutions are separated from the precipitates and the latter are treated as before mentioned. The sodium sulfid can be evaporated and crystalized, and the sodium sulfate may be used in the production of precipitated barium sulfate (blanc fixe) by reaction with barium sulfid.

I may of course invoke the doctrine of chemical equivalents wherever the same is applicable.

By "zinc carbonate" as used in the claims I mean that character of carbonate which is precipitated under the conditions here recited, including not only the normal carbonate, but the basic carbonate as well, or it may include either of them.

Having described my invention, what I claim is—

1. The process of making pigment which consists in mixing solutions of zinc and barium salts which do not react on each other, and the carbonate of an alkali metal, and recovering the resulting precipitates, substantially as set forth.

2. The process of making pigment which consists in mixing solutions of salts of zinc other than the sulfate with a solution of a salt of barium, and the carbonate of an alkali metal, and recovering the resulting precipitates, substantially as set forth.

3. The process of making pigment which consists in first mixing a solution of a salt of zinc with the carbonate of an alkali metal, then a solution of barium sulfid with the carbonate of an alkali metal, and finally adding a salt of zinc, and recovering and mixing the resulting precipitates, substantially as set forth.

4. A pigment comprising a mixture of zinc carbonate and barium carbonate, substantially as set forth.

5. A pigment comprising a mixture of precipitated zinc carbonate and precipitated barium carbonate, substantially as set forth.

6. A pigment comprising a mixture of the precipitates of zinc carbonate, barium carbonate, and zinc sulfid, substantially as set forth.

7. A pigment comprising a mixture of zinc carbonate, barium carbonate, and zinc sulfid, substantially as set forth.

In testimony whereof I affix my signature in presence of two witnesses.

WILLIAM J. ARMBRUSTER.

Witnesses:
EMIL STAREK,
G. L. BELFRY.